Patented Sept. 10, 1946

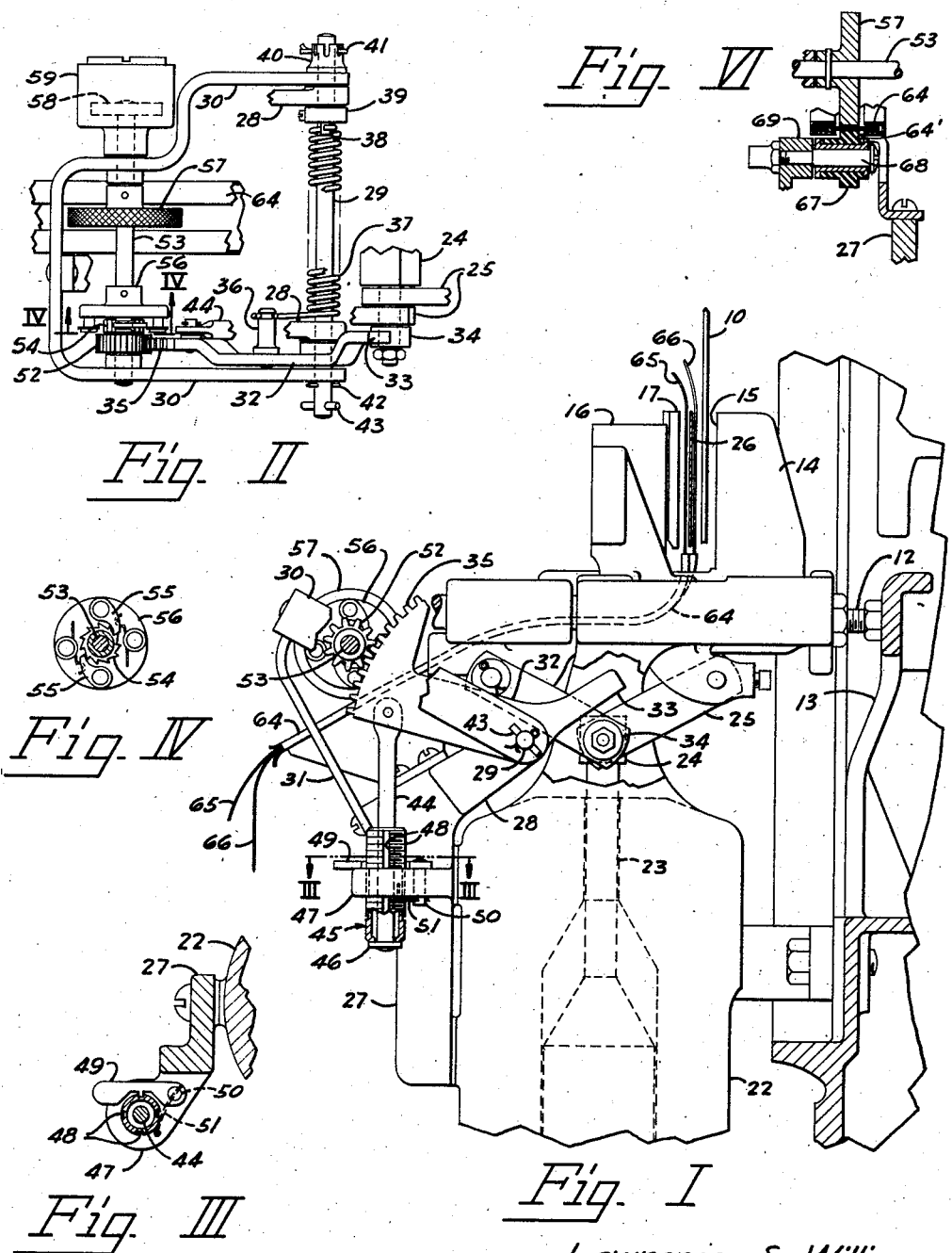

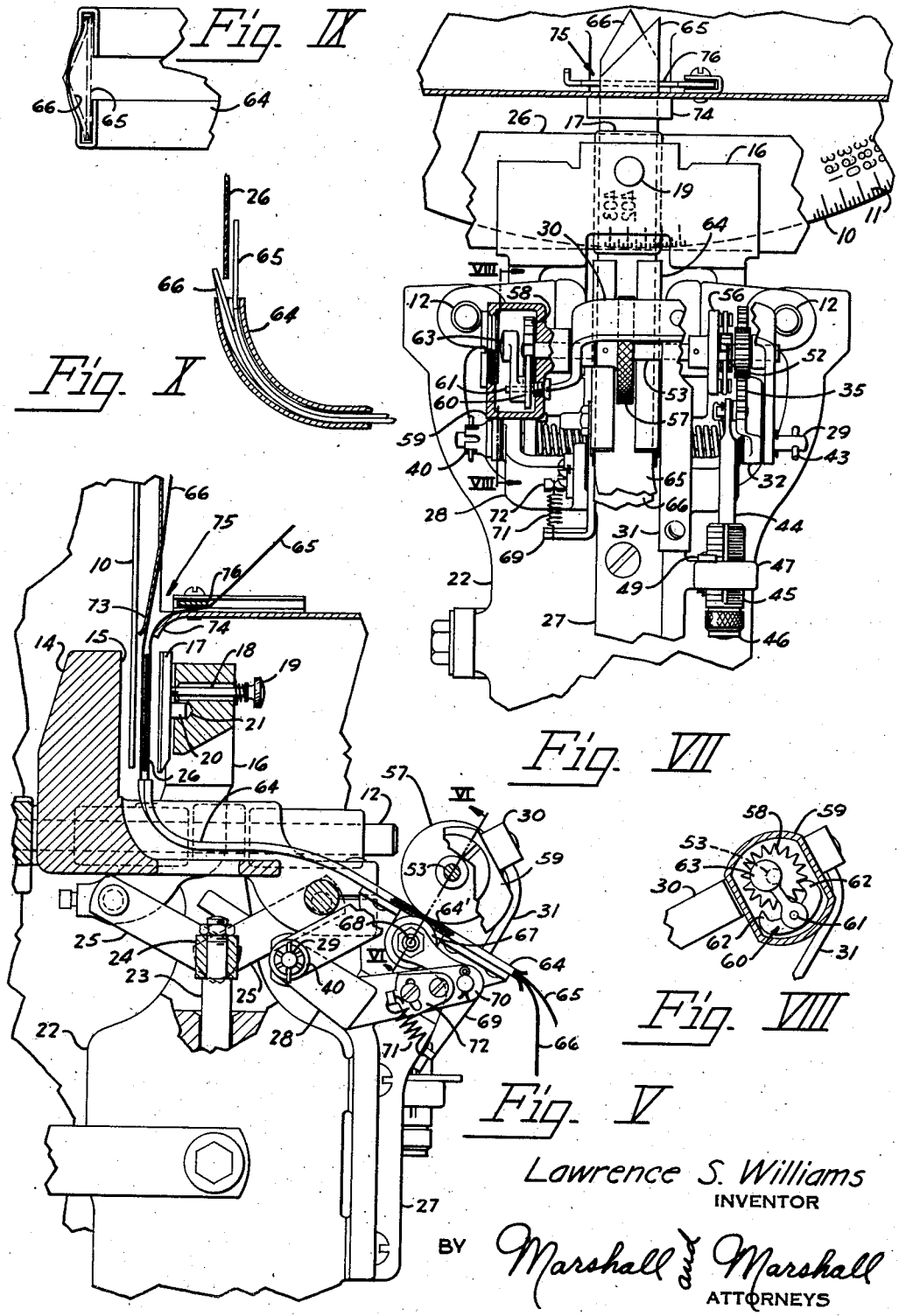

2,407,522

UNITED STATES PATENT OFFICE 2,407,522

TICKET PRINTING MECHANISM

Lawrence S. Williams, Toledo, Ohio, assignor to Toledo Scale Company, Toledo, Ohio, a corporation of New Jersey Application April 25, 1942, Serial No. 440,479

1 Claim. (Cl. 271—2.4)

This invention relates to mechanism for issuing printed tickets, and in particular to such mechanism for use with printing scales of the type described and explained in my United States Letters Patent No. 2,020,982.

It is an object of this invention to provide a mechanism for automatically feeding one or more ticket strips through a weight printing mechanism to receive the imprint of the weight of loads on the weighing scale to which the mechanism is attached.

It is another object of this invention to provide a mechanism for printing an individual ticket with the weight of a load being weighed on the scale to which the mechanism is attached.

It is a further object of this invention to provide means for varying the size of tickets printed by a weight ticket printing attachment.

More specific objects and advantages are apparent from the description, in which reference is had to the accompanying drawings illustrating a preferred embodiment of the invention.

In the drawings:

Fig. I is a view in elevation of mechanism embodying the invention, certain parts being broken away.

Fig. II is a fragmentary plan view of a portion of the mechanism shown in Fig. I.

Fig. III is a fragmentary horizontal sectional view, taken substantially on the line III—III of Fig. I.

Fig. IV is a detailed vertical sectional view, taken substantially on the line IV—IV of Fig. II.

Fig. V is a view in elevation of the mechanism shown in Fig. I but taken from the opposite side, certain parts being shown in section and certain parts being broken away.

Fig. VI is a detailed sectional view, taken substantially on the line VI—VI of Fig. V.

Fig. VII is a view in elevation, taken from the left-hand side of Fig. I, certain parts being broken away and certain parts being shown in section to more clearly explain their operation.

Fig. VIII is a fragmentary detailed sectional view, taken substantially on the line VIII—VIII of Fig. VII.

Fig. IX is an enlarged fragmentary view of the end of a paper feeding trough forming a portion of the device illustrated in Fig. I.

Fig. X is a fragmentary enlarged view in vertical section of the paper feeding trough, a portion of which is shown in Fig. IX.

These specific drawings and the specific description that follows merely disclose and illustrate the invention and are not intended to impose limitations upon the claim.

The improved ticket issuing printing mechanism which embodies the invention is intended for use in printing scales of the type disclosed in United States Letters Patent No. 2,020,982 and, therefore, the weighing scale itself is disclosed only fragmentarily herein to point out the connection of the present invention therewith.

A light thin metallic disk 10 (Figs. I, VI and VII) is rotated in a vertical plane in response to, and in proportion to, the weight of loads on the platform of the scale by the load counterbalancing mechanism of the scale. The disk 10 bears a series of raised printing indicia 11 (Fig. VII). That one of the indicia 11 which corresponds to the weight of the load on the scale is moved by the scale into the proper printing position.

Two rods 12 are secured to a frame member 13 of the weighing scale and extend horizontally backward from the weighing scale mechanism. An abutment 14 is mounted on the rods 12 for horizontal sliding movement and its flat rear face 15 is adjacent the side of the disk 10 which does not carry the printing indicia 11. A horizontally slidable platen frame 16 is also mounted on the rods 12 and is adapted to slide on these rods toward the abutment 14. The platen frame 16 carries a platen 17, which is attached to the frame 16 by means of a resiliently mounted screw 18 which has a knurled adjusting head 19. The platen 17 is kept in proper alignment by means of pins 20 which are secured thereto and which enter holes 21 bored in the face of the platen frame 16. The platen 17 has a flat forward face which is directed toward the face 15 of the abutment 14 but is located on the opposite side of the disk 10 therefrom.

A solenoid housing 22 is mounted on the frame 13 of the weighing scale immediately beneath the location of the horizontal slide rods 12. A core rod 23 of the solenoid has a cross head 24 attached to its upper end and two pairs of toggle links 25 are connected between the cross head 24 and the lower portion of the abutment 14 and platen frame 16. Upward movement of the core rod 23, when the solenoid is energized, pushes outwardly on the toggle links 25 and draws the abutment 14 and platen frame 16 toward each other to squeeze the disk 10 between the face 15 of the abutment and the platen 17. An inked ribbon 26 extends through the space between the disk 10 and the face of the platen 17.

A bracket 27 is bolted to the rear side of the solenoid frame 22 and has two upwardly extending arms 28 (Figs. I, II and V) between which there extends a horizontal shaft 29. The shaft 29 extends through the arms 28 and supports a substantially U shaped frame 30 which extends backwardly and upwardly from the shaft 29 and which is fixedly held in place by means of a brace 31 riveted to it and secured to the bracket 27. A rocker arm 32 is pivotally mounted on the shaft 29 near one of its ends. One end of the rocker arm 32 consists of a finger 33 which is engageable by a roller 34 mounted on one end of the cross head 24. The opposite end of the rocker arm 32 is shaped into a segment gear 35.

A pin 36 (Fig. II) is riveted to the rocker arm 32 and is engaged by one end of a spiral spring 37 which surrounds the shaft 29. The opposite end of the spring 37 is engaged with a pin 38 extending from a collar 39 which is fixedly secured to the shaft 29. The spiral spring 37 is wound in the proper direction to turn the rocker arm 32 in a clockwise direction (Fig. I). One end of the shaft 29 extends through a castellated collar 40 (Fig. II) which is located outside the frame 30 and engaged by a pin 41 extending transversely through the shaft 29. At the opposite end of the shaft 29 are located a cotter pin 42, which extends transversely through the shaft 29, and a turning pin 43 which also extends transversely through the shaft 29. In order to increase or decrease the tension of the spring 37 on the rocker arm 32, the cotter pin 42 is removed and the shaft 29 moved longitudinally a sufficient distance to disengage the pin 41 from the slot in the castellated collar 40. The shaft 29 is then rotated, by means of the pin 43, in the proper direction to increase or decrease the tension of the spring 37, the pin 41 once more engaged in a slot of the collar 40 and the cotter pin 42 reinserted.

A stroke limiting rod 44 (Figs. I and III) is pivotally connected to the lower end of the segment gear 35 and extends downwardly through the hollow interior of a vertically extending threaded sleeve 45. The lower end of the rod 44 carries a washer 46 which engages with the lower shoulders of the sleeve 45. The exterior of the sleeve 45 is threaded and screwed into a horizontally extending ear 47 of the bracket 27. Four longitudinal serrations 48 are cut in the outer surface of the sleeve 45 and are engageable by a manually movable latch 49 which is pivoted by means of a pin 50 extending through the ear 47. A wire spring 51 extends through the lower end of the pin 50 and into a hole bored in the ear 47.

To adjust the length of stroke of the rocker arm 32 and the segment gear 35, which is a portion thereof, the latch 49 is swung, against the action of the spring 51, out of engagement with the serrations 48. The sleeve 45 is then rotated to move it up which permits the rocker arm 32 to be swung in a clockwise direction (Fig. I) by the action of the spring 37 or down which moves the arm 32 downwardly against the action of the spring 37 by the engagement of the washer 46 with the end of the sleeve 45. Since the roller 34, which is connected to the cross head 24 and which engages the finger 33 of the rocker arm 32, moves through a fixed distance for each energization of the solenoid, the adjustment of the sleeve 45 just described varies the lost motion distance between the roller 34 and the finger 33. Thus, regardless of the adjustment of the sleeve 45, the segment gear 35 is always swung downwardly to the same point but it is permitted to return only until stopped by engagement of the washer 46 with the lower end of the sleeve 45.

The segment gear 35 is in mesh with a pinion 52 which is rotatably mounted on a shaft 53 extending parallel to the shaft 29 through the arms of the frame 30 near its rear end. A ratchet wheel 54 (see also Fig. IV) is integral with the pinion 52 and is engaged by a pair of spring-held pawls 55 which are mounted on a collar 56 pinned to the shaft 53. The downward stroke of the segment gear 35 rotates the pinion 52 and ratchet wheel 54 without turning the shaft 53 since the pawls 55 merely snap past the teeth of the ratchet wheel 54. However, the upward stroke of the segment gear 35 (under the returning impetus of the spring 37) rotates the shaft 53 in a counterclockwise direction (Figs. I and IV). This also rotates a knurled feeding wheel 57 which is pinned on the shaft 53 and an escapement wheel 58 which is pinned to the end of the shaft 53 opposite from the pinion 52. The escapement wheel 58 (Figs. II, VII and VIII) is located in the interior of an escapement housing 59 which is mounted on the end of the shaft 53 and prevented from turning by engagement between its outer wall and the frame member 30. An escapement pawl 60 is rockably mounted on a pin 61 and has two pointed arms 62 which are alternately engageable with the teeth of the escapement wheel 58. A counterweight 63 is attached to the escapement pawl 60 to cause it to rock with a pendulum-like motion. The escapement mechanism just described serves as a governor to prevent the return movement of the segment gear 35 under impetus of the spring 37 from being abrupt or sudden.

The knurled feeding wheel 57 extends down into a longitudinal opening in the upper wall of a hollow paper guide 64 which leads from a position in back of, and below, the feeding wheel 57 to a position between the opposing faces of the abutment 14 and platen frame 16. The periphery of the feeding wheel 57 is engaged with the upper surface of a ticket strip 65 which extends through the ticket guide 64. A duplicate ticket strip 66 also extends through the ticket guide 64 beneath the ticket strip 65.

A pressure roller 67 (Figs. V and VI) is rotatably mounted on a pin 68 which is threaded through one arm of a bell crank 69 pivotally mounted in a backwardly extending arm 70 of the bracket 27. A spring 71 (Fig. V) extends between the other arm of the bell crank 69 and an adjustable spring hook 72 mounted on the arm 70 of the bracket 27. The peripheral portion of the pressure roller 67 extends through a slot 64' in the lower wall of the ticket guide 64 and is engaged with the undersurface of the duplicate ticket strip 66. Pressure exerted by the spring 71 forces the pressure roller 67 toward the feeding wheel 57 and this pressure feeds the two ticket strips 65 and 66.

The upper end of the feeding guide 64 (Figs. IX and X) has square shoulders and a bellied center portion. When the ticket strips 65 and 66 are initially inserted in the mechanism, the duplicate ticket strip 66 is cut with a centered spear point end. When this duplicate ticket strip reaches the bellied upper end of the guide 64, because of the fact that the guide takes a sharp turn upward into the space between the abutment 14 and platen frame 16, the sharp spear point on the entering end of the duplicate ticket strip 66 adheres to the wall of the guide 64 having the greater curvature and thus is led in behind the inked ribbon 26 (as shown in Fig. X). The entering end of the ticket strip 65 is cut on the diagonal with the point thus created being at one side of the strip. Therefore, when this diagonally pointed end of the ticket strip reaches the upper end of the guide 64 the leading portion of the strip is between the square shouldered portion of the guide 64 and the strip 65 is not permitted to follow the duplicate strip 66 but is swung forwardly in front of the ribbon 26.

Two curved exit guides 73 and 74 are formed in that portion of the mechanism cover which is located above the space between the abutment 14 and platen 17 in line with the upper end of the ticket guide 64. The exit guide 73 is curved around into close juxtaposition with the face of the light thin metallic disk 10 and guides the duplicate ticket strip 66 out through an opening 75 between the exit guides 73 and 74. The ticket strip 65 is led over the exit guide 74 and beneath a cut-off knife 76 secured on the exterior of the mechanism housing.

The operation of the device is as follows: When the automatic load counterbalancing mechanism of the weighing scale has counterbalanced the load on the scale it has also rotated the disk 10 until that one of the indicia 11 corresponding to the weight of the load on the scale is located on the center line between the face 15 of the abutment 14 and the face of the platen 17 where the ticket 65 and duplicate ticket 66 are located. The operator then closes a switch which energizes the solenoid located in the housing 22 and snaps the solenoid rod 23 upwardly. This moves the abutment 14 and platen frame 16 toward each other, and pressure between the abutment face 15 and platen 17 squeezes the disk 10, duplicate ticket strip 66, inked ribbon 26 and ticket strip 65 together, printing an impression of the raised indicia 11 on both the duplicate ticket strip 66 and the ticket strip 65.

At the same time, the roller 34, which is mounted on the cross head 24, has moved upwardly and, depending upon the adjustment of the sleeve 45 as already described, strikes the finger 33 of the rocker arm 32. This swings the segment gear 35 downwardly against the tension of the spring 37 and rotates the pinion 52. However, due to the ratchet mechanism shown in Fig. IV, the shaft 53 is not rotated.

After the type impression has been made, the electrical circuit to the solenoid is opened and spring means (not shown) retracts the solenoid core rod 23. This moves the roller 34 downwardly out of the way of the finger 33 of the rocker arm 32 and the tension of the spring 37 swings the rocker arm and the segment gear 35 in a clockwise direction (Fig. I). This rotates the shaft 53 and the feeding wheel 57 and, depending upon the total length of the stroke of the segment gear 35 as adjusted by the sleeve 45, feeds the ticket strips 65 and 66 a certain distance through the ticket guide 64 and a portion of the ticket strip 65 of predetermined length is fed out beneath the cut-off knife 76. This ticket carries an imprint of the weight on the scale and may be torn off against the knife to serve as a weight indication.

The tickets on the strip 65 may be gummed on the side adjacent the platen 17 or pasted on the carton whose weight they bear; or they may be strips of light cardboard and used in various ways. The duplicate ticket strip 66 may be carried upwardly and wound on a duplicate ticket spool or led to a duplicate ticket box.

The embodiment of the invention that has been disclosed may be modified to meet various requirements.

Having described my invention, I claim:

In a printer for a weighing scale, paper feeding apparatus comprising, in combination, a fixed stroke reciprocable power source for actuating the printer, a pivoted lever driven in one direction by the power source, a spring urging the pivoted lever in the opposite direction, a segment gear on the end of the pivoted lever, a pinion meshing with the segment gear, a paper engaging roller, an unidirectional clutch operatively connecting the pinion and the roller during the spring urged movement of the lever, and an adjustable stop for limiting the spring urged travel of the lever thereby determining the paper feed per printing cycle.

LAWRENCE S. WILLIAMS.